United States Patent
Brichard

[15] 3,652,250
[45] Mar. 28, 1972

[54] APPARATUS FOR THE TREATMENT OR PRODUCTION OF FLAT GLASS FLOATING ON A LIQUID

[72] Inventor: Edgard Brichard, Jumet, Belgium
[73] Assignee: Glaverbel, Watermael-Boitsfort, Belgium
[22] Filed: Oct. 3, 1969
[21] Appl. No.: 863,600

[30] Foreign Application Priority Data

Sept. 5, 1969 Great Britain......................44,044/69

[52] U.S. Cl................................65/182 R, 65/99 A, 65/356
[51] Int. Cl. ......................................................C03b 18/02
[58] Field of Search ..............................65/169, 99, 182, 356

[56] References Cited

UNITED STATES PATENTS

| | | | |
|---|---|---|---|
| 3,127,261 | 3/1964 | Long | 65/182 X |
| 3,137,559 | 6/1964 | Van Praet | 65/356 X |
| 3,323,890 | 6/1967 | Javaux | 65/182 X |
| 3,438,761 | 4/1969 | Eloy | 65/182 X |
| 3,520,669 | 7/1970 | Greenler et al. | 65/182 X |
| 3,528,794 | 9/1970 | Montgomery | 65/182 X |

*Primary Examiner*—Arthur D. Kellogg
*Attorney*—Edmund M. Jaskiewicz

[57] ABSTRACT

In the production 26 treatment of flat glass floating on a liquid contained in a tank formed of refractory materials and having a passageway in the refractory material extending from one region of the tank to another some of the liquid is circulated through this passageway from one region of the tank to another in order to control or regulate the distribution of heat within the tank liquid.

5 Claims, 5 Drawing Figures

APPARATUS FOR THE TREATMENT OR PRODUCTION OF FLAT GLASS FLOATING ON A LIQUID

The present invention relates to the production or treatment of flat glass floating on a liquid bath, more particularly, to the construction of a tank for containing the liquid bath and formed of a refractory material having passageways directly within the refractory material.

In the "float" process of manufacturing or treating flat glass it is important to control the distribution of heat within the liquid bath upon which the glass is floated and cooled from a molten or plastic condition. If temperatures within the liquid bath, which may comprise molten tin, vary haphazardly it will be impossible to obtain flat glass of good quality and having good predetermined properties. One particularly important factor is the temperature gradient along the bath in the direction of movement of the floating glass ribbon. Temperatures within the liquid bath must vary according to a predetermined pattern from that point where the glass is first flowed onto the surface of the bath toward the other or discharge end of the bath in order that the glass ribbon will cool and solidify properly as it advances. It is also necessary to maintain the bath temperature substantially uniform over any given transverse section of at least one part of the bath.

The use of water-cooled heat exchangers positioned above the bath to cool the advancing glass ribbon has been proposed, but it has been found that the cooling action of such coolers tend to have a deleterious effect on the glass and led to its deformation.

Water-cooled heat exchangers immersed in the bath have also been used. The arrangement of head exchangers with the bath has not been very satisfactory because of the corrosive action of the bath liquid. Since is was necessary to remove periodically the heat exchangers for replacement, in practice the heat exchangers were thus positioned in the marginal zones of the bath which were not covered by the glass ribbon. This positioning of the heat exchangers laterally outwardly from the glass ribbon produced transverse temperature gradient which had unfavorable effects on the surface of the glass.

It has also been proposed to cool the liquid bath in order to insure proper solidification of the floating glass ribbon by circulating a liquid coolant through tubes imbedded in the refractory floor of the tank.

It is therefore the principal object of the present invention to provide a novel and improved tank and process for controlling the temperature of a liquid bath in a refractory tank used in the production or treatment of flat glass.

It is another object of the present invention to provide a tank and process for the circulation of liquid within a tank between different regions of the tank by circulating the liquid through passageways formed directly in the refractory material of the tank.

According to one aspect of the present invention there may be provided a tank for use in the manufacture or treatment of flat glass floating on a liquid bath contained within the tank. The tank is formed of refractory material means which may comprise a plurality of refractory blocks. Passageway means are provided within the tank refractory material for flowing the liquid from one region of the tank to another. At least a portion of said passageway means is defined directly by the refractory material forming the tank so that liquid flowing through the passages is in heat exchange relationship with the refractory material. This heat exchange between the liquid and the refractory material defining the passages will affect the distribution of heat within the bath. The passageways may be in the floor or wall refractory materials of the tank.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
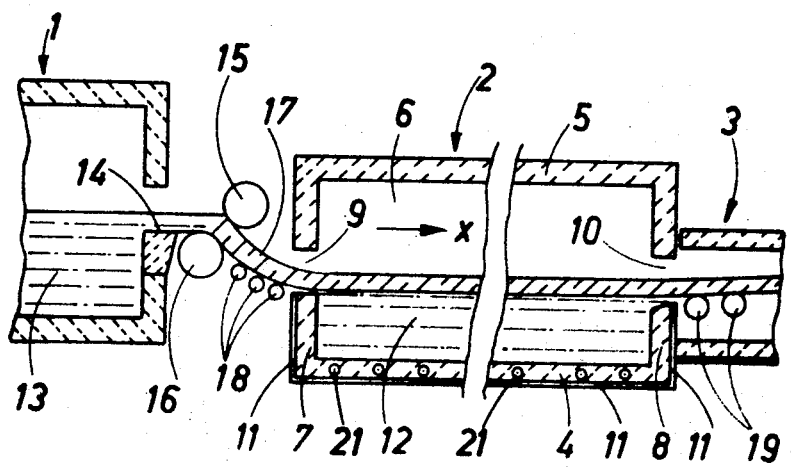
FIG. 1 is a longitudinal vertical sectional view through a float tank and adjacent portions of a melting tank and an annealing lehr.

The apparatus as shown in FIG. 1 comprises a melting tank 1, a float tank 2 and an annealing lehr 3. The float tank comprises a bottom wall or floor 4, a crown 5, side walls 6 and end walls 7,8 spaced from the crown 5 by slots 9,10. All of these described components of the float tank 2 are made of refractory materials. A metal wall 11 hermetically encloses the floor 4, side walls 6 and end walls 7,8 of the tank which contains a bath of molten material 12 which is usually molten tin but may be molten silver or a molten metal salt.

The melting tank 1 contains a bath of molten glass 13 which is cast over a casting lip between casting rollers 15,16 which shape a glass ribbon 17. The glass ribbon 17 is then conveyed by a series of transporting rollers 18 to the slot 9 of the float tank in which it is deposited on the bath of molten material 12 while continuing to move in the direction indicated by the arrow X. The glass ribbon is fire polished on the bath of molten material 12 and moves toward slot 10 of the float tank from which it is conveyed by rollers 19 to the annealing lehr 3.

Figure 2:
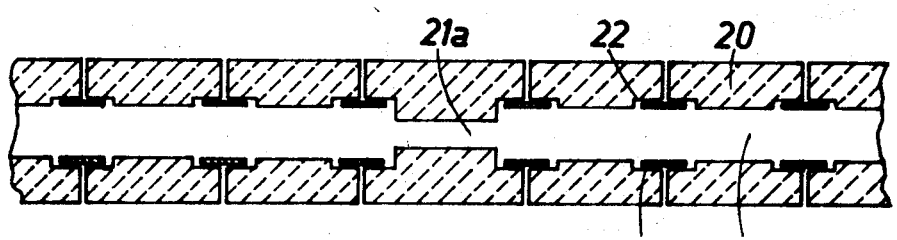
FIG. 2 is a transverse sectional view of a portion of the floor 4 of the float tank of FIG. 1.

The floor 4 of the float tank 2 comprises a plurality of rows of refractory blocks 20 which extend transversely of the tank and a portion of one such row of blocks is shown in FIG. 2. Each block within the row is formed with a through bore with the bores of the assembled blocks being aligned so as to constitute a passageway 21 through which liquid withdrawn from the bath 12 can flow from one region of the tank to another within the refractory floor. Each end of a block bore is provided with an enlarged opening to form an annular recess 22. Between adjacent blocks a sealing ring 23, is seated within a pair of annular recesses formed by the cooperating enlarged opening so as to overlap and thus seal the joint between the blocks. The sealing ring functions to prevent the flow of liquid from the interior of the tank into the passageway 21 and also the flow of liquid in the opposite direction. One block of the row of blocks shown in FIG. 2 is provided with a smaller diameter bore so as to form a constriction 21a in order to provide a nonuniform thermal conditioning effect along the passageway 21. With the refractory blocks 20 being made of carbon and in contact with the liquid bath 12 there is only a very small resistance to heat exchange between a liquid flowing in the passageway 21 and the liquid constituting the bath within the tank. Heat insulating refractory material such as refractory heat insulating blocks may be mounted between the carbon refractory blocks 20 and the exterior of the tank.

In the embodiment of the invention described herein the passageway 21 for the flow of liquid has been defined directly by the refractory material of the floor. However, it is to be understood that such passageways can also be formed in one or more of the refractory material side and end walls of the tank, depending on the heat distribution pattern desired within the liquid bath. The walls of a float tank have been very satisfactorily constructed by assembled prefabricated refractory blocks. However, it has not been previously proposed to circulate a coolant internally within the refractory blocks in order to control temperatures within the bath. The previous practice comprises providing tubes through which the coolant has been circulated but it has been difficult to insure the effective heat exchange contact between the tubes and the refractory blocks. In addition, it was necessary to protect the tubes from the corrosive action of any bath liquid which might reach the tubes by flowing through joints between the blocks.

Figure 3:
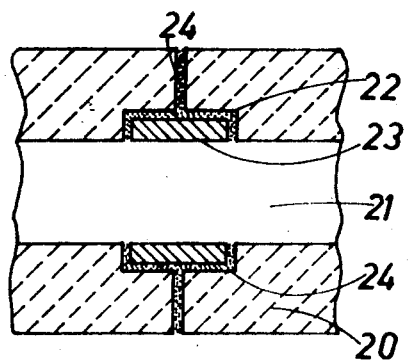
FIG. 3 is a portion of the sectional view of FIG. 2 but in enlarged scale and showing a floor joint in greater detail.

As may be seen in FIG. 3, the sealing of the joints between the blocks may be improved by depositing a finely divided substance 24, such as carbon powder, between the end faces of successive blocks and between such blocks and the sealing ring. This finely divided material may also be used to prevent bath liquid from draining downwardly between adjacent transverse rows of blocks.

As the glass ribbon 17 advances along the upper surface of the bath 12, quantities of bath liquid are continuously withdrawn from the bath at positions in the walls of the tank and recirculated to other regions of the bath through selected passageways 21 extending transversely across the tank within the refractory floor. The liquid will circulated by thermal syphon effect because of the temperature differential between different regions of the bath, however, one or more pumps may be provided for positively circulating the thermal conditioning liquid through the floor. Such circulating means are generally desirable when the thermal conditioning medium is different from the medium of the liquid bath.

During operation of the tank, the passageways in certain walls of the tank may be connected into a circuit or circuits for liquid thermal conditioning medium so that such a medium can be circulated through the passageways in order to regulate the distribution of heat in the bath by heat exchange between the circulating liquid and the selected tank wall or walls. Quantities of the liquid medium comprising the bath may be circulated through the floor or wall passageways as a thermal conditioning medium. The positions at which the liquid is withdrawn from and returned to the bath and the positions at which the circulating liquid flows through the tank floor and/or other walls are selected to achieve a predetermined thermal control effect. It is apparent that the heat exchange between the circulating medium and the bath is determined by location of the circulating liquid within the tank floor or walls. The passageways 21 may extend through every transverse row of floor blocks over the entire width of the tank. This arrangement is particularly flexible because different passageways may be employed at different times to obtain a predetermined pattern of thermal control. Suitable conduits are provided for connecting the outlet and inlet in the tank walls to the appropriate passageways 21. It is not necessary that all of the floor blocks have bores therein.

Figure 4:
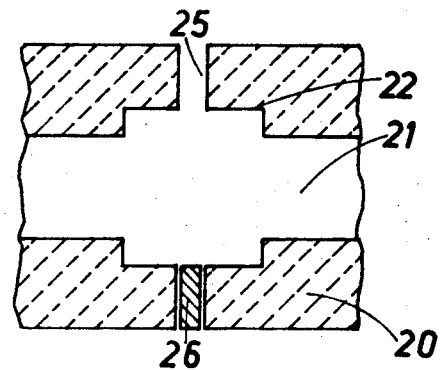
FIG. 4 is a view similar to that of FIG. 3 and illustrates another form of floor joint.

It is also possible to withdraw liquid from the bath at selected portions within the floor area. Certain ones of the blocks 20 may be formed with bores extending from the top faces of the blocks to the passageway 21. It is also possible to withdraw bath liquid by spacing adjacent blocks apart as shown in FIG. 4 to provide a slot 25 through which bath liquid can drain into the passageway 21. Spacing strips 26 of a suitable material may then be sandwiched between adjacent blocks below the level of passageways 21 to maintain the blocks at appropriate spacing. These described blocks and openings in or between top faces of the floor blocks can be used also to reintroduce bath liquid into the tank. It is also possible to withdraw and/or reintroduce liquid into the tank through the side and end walls of the tank in addition to the floor.

Figure 5:
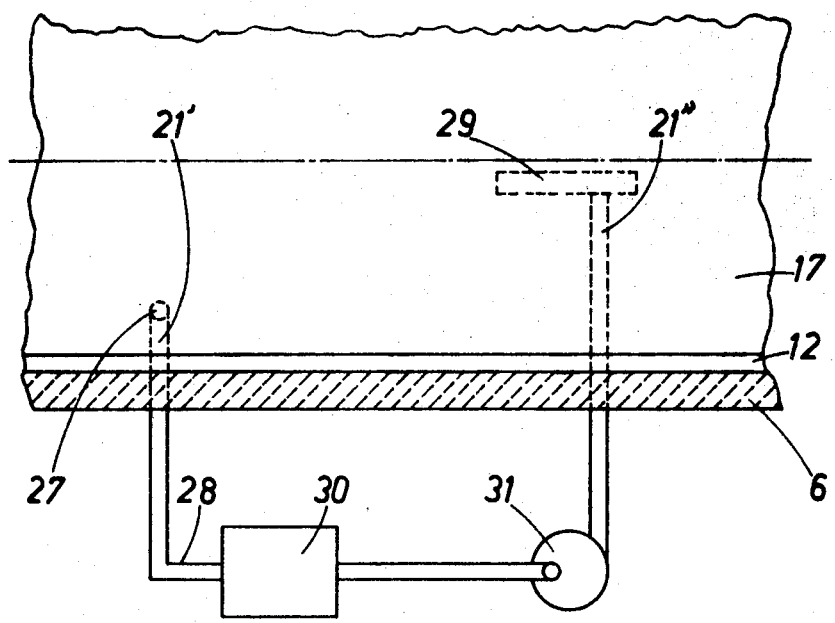
FIG. 5 is a top plan view of a portion of the float tank of FIG. 1 and showing a thermal conditioning system according to the present invention.

Proceeding next to FIG. 5 there is illustrated diagrammatically an arrangement wherein bath liquid drains continuously from the interior of the tank through a hole 27 formed in a refractory block of the tank floor and communicating with a passageway 21' extending laterally from the location of the hole to one side of the tank through aligned floor blocks. The passageway 21' is connected to a flow line 28 located externally of the tank and which leads to a transverse passageway 21" formed by a plurality of aligned bores in a transverse row of floor blocks positioned further along the length of the tank in the downstream direction. Passageway 21" does not extend over the full width of the tank but terminates just short of the longitudinal vertical center plane of the tank indicated at 35. The end of passage 21" communicates with a slot 29 defined between adjacent blocks of one or a plurality of transverse rows of blocks. Within flow line 28 there may be provided a purifying unit 30 which removes impurities from the circulating molten tin or other liquid and a pump 31 which provides positive circulation of the liquid. Another liquid circulating system identical with that illustrated in FIG. 5 is provided on the opposite side of the vertical plane 35 of the tank and is arranged symmetrically with respect to the system shown in FIG. 5. The circulating system of FIG. 5 can readily be used at all operating temperatures between 1,000° C. and 600° C. which are generally the extreme temperatures of such a flow bath.

As described above every block in the transverse rows of blocks in the floor of the tank may be provided with a bore to form a plurality of passageways extending over the full width of the tank. When a conditioning system such as FIG. 5 is employed it is apparent that only a small proportion of the floor blocks need have bores to define passages therein.

In some thermal conditioning systems employing a circulating bath liquid it may be necessary to supply to or extract heat from the circulating liquid in addition to the heat which is supplied or extracted as a result of the heat exchange relationship of the liquid in the walls of the tank. For such a purpose one or more heat exchangers may be employed. Such a heat exchanger is generally positioned externally of the tank but it is also possible to provide one or more heat exchangers within the passageways through the refractory material.

It should be borne in mind that effective thermal control is possible without any heat exchangers. The temperature differential between two regions of the tank may be modified merely by flowing liquid through a passageway within a tank at the region at which it is desired to extract heat from the bath and then through a passageway through a tank wall at the region where the bath is cooler and at which it is desired to supply heat to the bath.

Where a seal is desired between adjacent blocks in a tank wall a finely divided material may be used such as carbon powder which is not wetted by the bath liquid. Such a seal is required if it is essential to prevent any contact between the coolant liquid and the bath liquid. In those situations where the same liquids is used as a coolant and the bath it is immaterial if liquid from the bath drains to the coolant passageway in the refractory material. Where the bath liquid itself is used as the thermal conditioning medium a quantity of the bath liquid can be continuously withdrawn from one region of the tank and reintroduced to another region thereof after flowing through passageways extending within the refractory walls. In this manner the temperature of the refractory material of the tank in these regions will be modified and, by heat exchange, the bath liquid adjacent these areas of refractory material will also be varied in temperature. The present invention also contemplates circulating the bath liquid simultaneously in separate or linked circuits, controlling the relative proportions of liquid flowing in different circuits or branches of different circuits or mixing the quantities of liquid in the different circuits in the controlled proportions.

The flow passageways are distributed over the area of the tank according to the thermal control effects which are desired in a particular case. Floor passages may extend longitudinally and/or transversely of the tank and a passage may extend over the whole or only a portion only of the extent of the tank floor in a given direction. As described above, it is a particular feature of the present invention to circulate a liquid conditioning medium successively through passages located at different regions along the length of the tank in order to obtain a thermal conditioning effect.

The refractory blocks having bores therethrough which are used to form the floor and/or walls of a tank may have a structural member passing through a bore or series of aligned bores for anchoring the blocks to a supporting structure. The anchoring of blocks is necessary to prevent displacement of a block because of the effects of buoyancy forces which may result when the tank contains a liquid of higher density than the block. The liquid conditioning medium can flow through the clearance space between the walls of the bore and a structural member traversing the bore. The structural member may be tubular or an angle iron.

It will be understood that this invention is susceptible to modification in order to adapt it to different usages and conditions.

What is claimed is:

1. Apparatus for the production or treatment of flat glass sheet floating on a liquid bath of molten metal material, said apparatus comprising a float tank having top, side and bottom walls, said bottom wall comprising a plurality of refractory blocks having a bore opening extending therethrough, the block being disposed end-to-end forming a jointure therebetween with the block bore openings in communication, means for withdrawing liquid from said bath, means for forcing at least a portion of the withdrawn liquid to flow from one region of said tank to another within said bottom wall, a sealing ring disposed at said jointure and within the bore openings between the blocks and overlapping the ends of adjacent blocks at the jointure for sealing said jointure between adjacent blocks.

2. Apparatus according to claim 1 in which the said bore openings formed in the blocks are enlarged at their ends abutting to the said jointure between the blocks, the said sealing ring being positioned in the said enlarged openings.

3. Apparatus according to claim 1 in which a sealing powder is interposed between the said sealing ring and the faces of said openings.

4. Apparatus according to claim 1 in which a sealing powder is interposed in the jointure between said blocks and between the said passageway and the inner face of the liquid bath.

5. Apparatus according to claim 1 in which there is between the said passageway and the bath at least one connection formed by a space between two adjoining blocks of which at least one is provided with one such passageway.

* * * * *